United States Patent
Seiford, Sr.

(10) Patent No.: US 9,695,585 B1
(45) Date of Patent: Jul. 4, 2017

(54) PORTABLE DOMED STORM SHELTER

(71) Applicant: Donald S. Seiford, Sr., Webb Lake, WI (US)

(72) Inventor: Donald S. Seiford, Sr., Webb Lake, WI (US)

(*) Notice: Subject to any disclaimer, the term of this patent is extended or adjusted under 35 U.S.C. 154(b) by 0 days.

(21) Appl. No.: 15/053,784

(22) Filed: Feb. 25, 2016

(51) Int. Cl.
*E04B 1/32* (2006.01)
*E04H 9/14* (2006.01)
*E04B 1/00* (2006.01)

(52) U.S. Cl.
CPC ............ *E04B 1/3211* (2013.01); *E04H 9/14* (2013.01); *E04B 2001/0061* (2013.01); *E04B 2001/3276* (2013.01)

(58) Field of Classification Search
CPC .......... E04B 1/3211; E04B 2001/3276; E04B 2001/0061; E04H 9/14
See application file for complete search history.

(56) References Cited

U.S. PATENT DOCUMENTS

| | | | | |
|---|---|---|---|---|
| 2,706,538 A * | 4/1955 | Schumann | ............... | A47F 5/02 248/349.1 |
| 2,820,990 A * | 1/1958 | Johnson | ............... | E04B 1/3211 52/461 |
| 2,944,370 A * | 7/1960 | Malarkey | ............... | E04B 1/3211 220/4.28 |
| 3,844,074 A * | 10/1974 | Ahern | ............... | E04B 1/1903 52/81.4 |
| 3,894,367 A * | 7/1975 | Yacoboni | ............... | E04B 1/3211 52/81.2 |
| 3,999,337 A * | 12/1976 | Tomassetti, Jr. | ...... | E04B 1/3211 454/334 |
| 4,276,733 A * | 7/1981 | Casper | ............... | E04B 1/3211 52/71 |
| 4,297,814 A * | 11/1981 | Tomassetti, Jr. | ...... | E04B 1/3211 52/81.4 |
| 4,606,366 A * | 8/1986 | Collet | ............... | A45B 23/00 135/20.1 |
| 4,788,803 A * | 12/1988 | Seitz | ............... | E04B 1/3211 52/248 |
| 4,873,796 A * | 10/1989 | Akmese | ............... | E04B 1/3211 52/223.7 |

(Continued)

FOREIGN PATENT DOCUMENTS

| | | | | |
|---|---|---|---|---|
| DE | 2433357 A1 * | 1/1976 | ............ | A63H 33/10 |
| DE | 102007040447 A1 * | 3/2009 | ............ | E04B 1/3211 |
| JP | WO 0144593 A1 * | 6/2001 | ............ | E04B 1/3211 |

*Primary Examiner* — Jeanette E Chapman
(74) *Attorney, Agent, or Firm* — Jacobson and Johnson LLC; Thomas N. Phung (57) ABSTRACT

A dome-shaped shelter, which is readily manually assembled and disassembled, as needed, the shelter comprising a plurality of side-by-side generally triangular shaped arched segments enclosing a generally circular area, a support base with each of the segments comprising a lower end resting on the support base and a pair of spaced apart rigid upwardly arched side members converging upwardly from the lower end and a weather and UV resistant covering skin, a latch assembly securing each arched side member of a segment to the adjacent arched side member of an adjacent segment, a rigid vertical support mast releasably secured at the center of the encircled area, and manually releasable locking means securing the segments to the mast.

20 Claims, 5 Drawing Sheets

(56) References Cited

U.S. PATENT DOCUMENTS

| | | | | |
|---|---|---|---|---|
| 5,276,733 | A * | 1/1994 | Uno | G06Q 20/346 379/100.02 |
| 5,319,904 | A * | 6/1994 | Pascoe | E04H 1/1205 52/584.1 |
| 5,544,671 | A * | 8/1996 | Phillips | B60P 3/341 135/150 |
| 5,628,154 | A * | 5/1997 | Gavette | E04B 1/3211 403/326 |
| 6,588,157 | B1 * | 7/2003 | Davies | E04B 1/3211 52/81.1 |
| 6,766,623 | B1 * | 7/2004 | Kalnay | E04B 1/34305 135/128 |
| 6,880,298 | B2 * | 4/2005 | Davies | E04B 1/3211 446/112 |
| 8,807,153 | B2 * | 8/2014 | Dalo | E04H 15/18 135/98 |
| 2004/0065026 | A1 * | 4/2004 | Wilson | E04B 1/3211 52/80.1 |
| 2009/0025306 | A1 * | 1/2009 | Reed | E04B 1/3211 52/80.1 |
| 2010/0226775 | A1 * | 9/2010 | Hartman | B60L 11/1822 416/131 |
| 2010/0313490 | A1 * | 12/2010 | Park | E04B 1/3205 52/80.1 |
| 2015/0000216 | A1 * | 1/2015 | Noble | E04B 1/3205 52/80.1 |

* cited by examiner

PORTABLE DOMED STORM SHELTER

FIELD OF THE INVENTION

This invention relates generally to storm shelters and, more specifically to a portable storm shelter that provides is capable of protecting its' user from pending storms including hurricanes or tornados.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Local and worldwide reports and documentaries describe and provide video of the harm and anguish resulting from hurricanes, tornados, severe wind and/or rainstorms. This is especially true where residents do not have readily available access to adequate shelter that they can rely on to protect them from the storm elements. This is not uncommon at locations, such as in the southern states, where residences or homes do not have basements or other permanent storm shelters.

There are a number of patented structures aimed at providing storm shelters where needed as explained above. Some are aimed primarily at mobile or prefabricated homes and provide permanent above ground outer structures to the residence or build underground protective areas within the interior of the home. The present invention provides an above-ground storm shelter which can be erected close to but separate from the residence and which is readily assembled for use when needed and disassembled and stored or transported when not in use.

BRIEF SUMMARY OF THE INVENTION

The storm shelter is a domed structure resting on a supporting base. It is made up of a number of individual sections or segments each of which is an essentially upwardly curved or arched triangular section or segment with its bottom or lower edge resting on the supporting base. The side edges or beams of each section are releasably latched to each adjacent segment and are releasably locked together at their upper ends to a centrally located vertical rigid support or mast to completely enclose the interior generally circular area. Individual segments can be manually released if needed to provide ingress and egress to the interior. The structure is dome shaped to best deflect wind and any debris. The rigid side beams and the covering material of each segment are made from high-tech non-corrosive, chemical resistant, UV stable materials with high strength and high impact characteristics and electrically non-conductive so not susceptible to lightning strikes or downed power lines.

Typically, with no limitation intended, and only intended to give an example of a shelter constructed in accordance with the teachings of this invention might have an interior head room of about six feet nine inches in an enclosed generally circular area having a diameter of about twelve feet might be made up of twelve sections and a center mast. Each individually installed section or segment might weigh in the order of about sixty pounds. (It is estimated that it would take about half hour to completely erect or disassemble the shelter with an average crew.)

From the brief description above and after the following detailed description it should become clear that the instant invention can provide an almost immediate shelter from hurricanes, tornados, severe wind and/or rainstorms as well as being capable for use in and for a variety of functions and purposes.

U.S. Pat. No. 5,671,568 describes a domed storm shelter which, unlike the instant invention is a permanent structure adjacent or nearby a residence. It is not intended or able to be dismantled or disassembled and stored or transported when not needed. Except for its use of a dome for protection it does not have any of the versatility features of the instant invention as will be come more apparent from the following detailed description.

DESCRIPTION OF THE PREFERRED EMBODIMENT

The object of this invention is to design a portable storm shelter structure that is strong, virtually indestructible, affordable to the average homeowner, and to be available, in case of pending dangerous storms, including but not limited to hurricanes or tornados. The present invention is ideal for use by mobile home owners or in associated with homes that do not have safety shelters such as basement readily available for storm emergencies.

The portable storm shelter structure is preferably constructed with high tech polymer plastics that were not readily available to the public as recently as 10 years ago wherein the polymer plastics may be translucent or transparent to allow light to pass therethrough, or opaque or anywhere inbetween. The portable storm shelter structure alternatively may be made from a light reflective material to prevent or reduce interior heating caused by the sun.

Ideally, all of the hardware of the portable storm shelter structure would be of a non-electrically conductive material to help prevent lightning strikes and/or reduce the probability of injuries to the user if lightning happens to strike the structure by dissipating or transferring the electrical energy of the lightning to the ground.

Ideally the portable storm shelter structure may be left in place and used as a play house, a temporary shelter similar to that of a forest cabin or storage building, or a green house or may be taken down and re-assemble or erected in a pending storm. The supporting foundation may include pre-installed anchor sockets, which will enable the portable storm shelter structure to be erected in as little as less than 30 minutes depending on the experience of the user.

The portable storm shelter structure may also be erected on any flat ground area by the use of specialized screw anchors. When the portable storm shelter structure is fully erected the portable storm shelter structure is wind and water proof, and includes a venting system which may be located on various regions of the shelter including but not limited to a cap region, on the segment(s), and the combination.

Each segment of portable storm shelter structure preferably comprises a pair of spaced-apart arched beams made of super strength non-metal (non-electrically conductive) material and preferably covered with a film of transparent or translucent weather resistant plastic. The side edges of alternate segments may be grooved or slotted to securely but releasably engage mating edges of adjacent segments and are releasably latched together. Alternatively the edges of the adjacent segment may instead include a weather resistant seal to securely but releasably engage mating edges of segment to weather-proof the mating edges of the segments. Preferably, all necessary hardware would be made of non-electrically conductive material to reduce or prevent lightning strikes during a storm and all connections are weather sealed.

Figure 1:
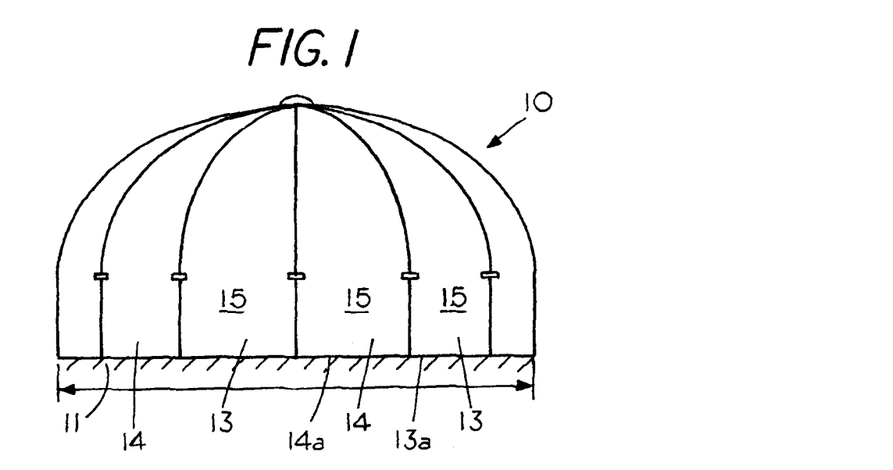
FIG. 1 is a front view showing a portable storm resistant dome-shaped shelter.
Figure 2:
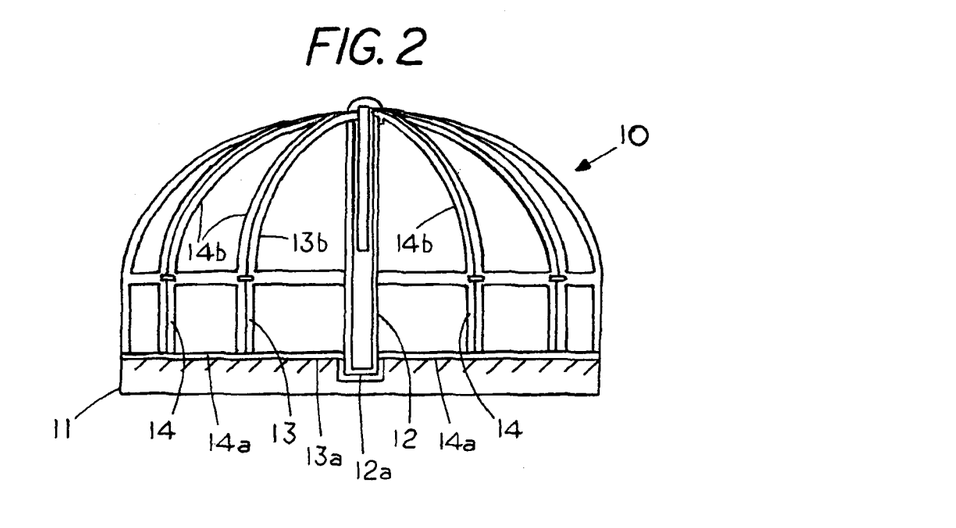
FIG. 2 is a skeletal view showing the portable storm resistant dome-shaped shelter of FIG. 1.

Referring to FIGS. 1 and 2, FIG. 1 is a front view and FIG. 2 is a skeletal view showing an embodiment of a portable storm resistant dome-shaped shelter 10 of the present invention that is readily manually assembled and disassembled, as needed, and is capable of protecting its' user from pending storms including hurricanes or tornados. Dome-shaped shelter 10 generally comprises a plurality of side-by-side generally triangular shaped arched segments enclosing a generally circular area. A feature of the present invention is that the plurality of side-by-side generally triangular shaped arched segments are preferably generally equal dimensioned and are stackable to reduce required storage space so that the dome-shaped shelter 10 may be conveniently stored in a garage or shed space in the disassembled and unused condition while also improving transportability.

Dome-shaped shelter 10 is shown in FIGS. 1 and 2 supported on a support base 11, which may comprise a present or preformed foundation such as a concrete slab or the like. The concrete slab may be a separate unit or alternative comprises a portion of an existing concrete patio.

Although not intended as a limitation, an example of a suitable dimensioned support base 11 may comprise a twelve-foot diameter with around 112 sq. ft. of floor space with the aforementioned portable storm shelter structure comprising a preferred total weight of about 900 pounds with the sections or segments having a preferred weight of less than 60 pounds to permit for relative ease in assembly by the homeowner without the need of specialize tools.

Alternatively embodiment of the supporting foundation may comprise supporting foundation having much larger diameters and much larger floor space but these storm shelter structures may not be as portable.

Each of the segments includes a lower end resting on support base 11 and a pair of spaced apart rigid upwardly arched side members converging upwardly from the lower end of the segment and a weather and UV-resistant covering skin. In the embodiment of FIGS. 1 and 2 the plurality of side-by-side generally triangular shaped arched segments are shown as comprising a multitude of female segments 13 and an equal number of male segments 14. Segments 13 and 14 may be form from a plurality of pre-assembled non-metallic individual parts or alternative from a one-piece molded corrosion and chemical resistant non-metallic material such as a polymer plastic or the like.

Each of the female segments 13 and male segments 14 include a lower end 13a, 14a resting on support base 11 and a pair of spaced apart rigid upwardly arched side members 13b, 14b converging upwardly from lower end 13a, 14a and a weather and UV covering resistant skin 15.

Dome-shaped shelter 10 includes a tubular rigid vertical support mast 12, preferably made from a non-metallic material or metallic material containing coating of a non-electrically conductive material thereon to reduce or prevent lightning strikes during a storm, having a first end 12a and a second end 12b with the first end 12a of tubular rigid vertical support mast 12 releasably secured to support base 11 at the center of the encircled area. It is anticipated that tubular rigid vertical support mast 12 may be secured to support base 11 in a variety of ways including but not limited to being implanted into support base 11, lockingly connected to an attachment member that is fixedly connected to support base 11, bolted to support base 11, and fictionally fitted to a recess or slot within support base 11.

Figure 3:
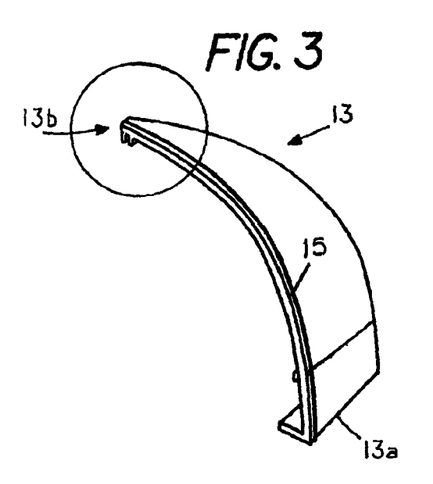
FIG. 3 shows a perspective view of a female segment having a slotted tapered end located distal to the a lower end.
Figure 4:
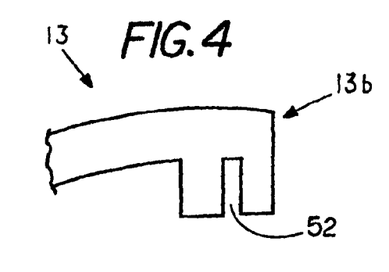
FIG. 4 shows a close-up view of the slotted tapered end of FIG. 3.
Figure 5:
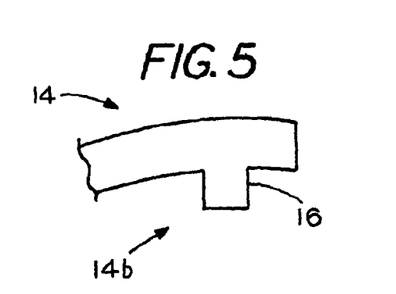
FIG. 5 shows a close-up view of abutment tapered end of a male segment.

FIG. 3 shows a perspective view of female segment 13 with the female segments 13 each having a slotted tapered end 13b located distal to the lower end 13a. FIG. 4 shows a close-up view of the slotted tapered end 13b, which includes a recess or slot 51 that functions to receive and secure a portion of the second end 12b of tubular rigid vertical support mast 12 therein to assist in maintaining the positioning of female segment 13 with respect to tubular rigid vertical support mast 12. Although male segment 14 comprises a similar shape and size to female segment 13, a feature of the present invention is that instead of having slotted tapered end, male segment 14 includes an abutment tapered end 14b having an abutment surface 16 that functions to engaging a portion of the second end 12b of tubular rigid vertical support mast 12 thereto to assist in supporting the positioning of male segment 14 with respect to tubular rigid vertical support mast 12. FIG. 5 shows a close-up view of abutment tapered end 14b.

Another feature of the present invention of the present invention as shown in FIG. 3 is that each of the female segments 13 include weather resistant seals 15 located along the edges of female segments 13 to block out the weather elements when portable storm resistant dome-shaped shelter 10 is in the assembled condition.

Figure 6:
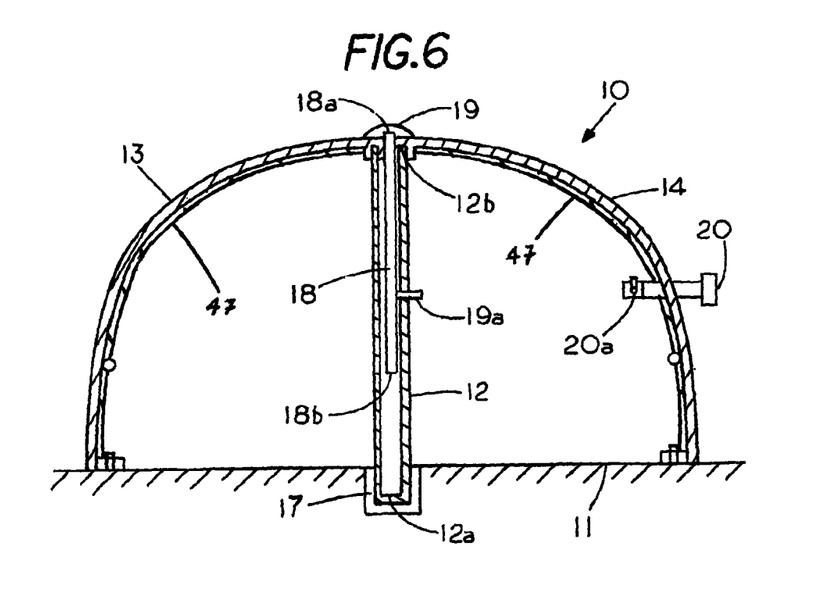
FIG. 6 is a cross-sectional view of portable storm resistant dome-shaped shelter.

FIG. 6 is a cross-sectional view of portable storm resistant dome-shaped shelter 10 showing the first end 12a of tubular rigid vertical support mast 12 secured to support based 11 through a fitting engagement of the first end 12a of tubular rigid vertical support mast 12 with a sleeve pipe 17 that is embedded within support based 11. The present invention also includes a manually releasable locking for securing mast 12 to segments 13 and 14, which is shown in the embodiment of FIG. 6 is shown as comprising a slideable arm 18 having a first end 18a secured to a center seal cap 19, a second end 18b located entirely within an interior of center mast 12, and a control lever 19a connected to slideable arm 18 and extending through a portion of center mast 12 for engaging, locking and securing seal cap 19 to segments 13 and 14 and unlocking, and disengaging center seal cap 19 from segments 13 and 14.

FIG. 6 also shows portable storm resistant dome-shaped shelter 10 including an air ventilation system located on and extending through male segment 14 segments with the air ventilation system 20 comprising a down-pipe having a quick action ball valve 20a therein.

FIG. 6 further shows portable storm resistant dome-shaped shelter 10 including a preferably fire retardant or fire resistant thermal-insulating layer 47 located on the interior surfaces of segments 13 and 14 to reduce temperature fluctuation such as reducing daytime over heating of the interior of portable storm resistant dome-shaped shelter 10 by the sun, especially in warmer climates and to reduce nighttime cooling of the interior of portable storm resistant dome-shaped shelter 10 especially in colder climates.

Figure 7:
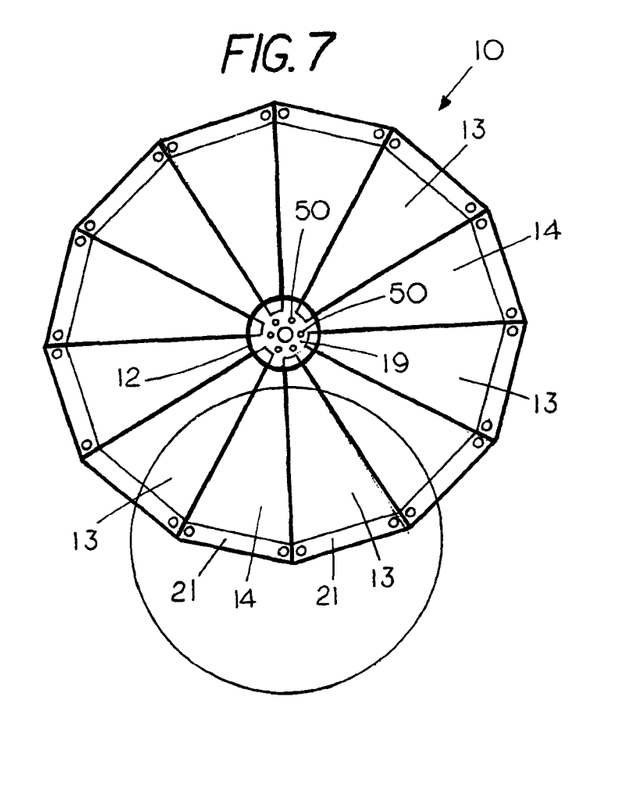
FIG. 7 is a bottom view of portable storm resistant dome-shaped shelter showing the female and male segments each having a base plate-supporting member.
Figure 8:
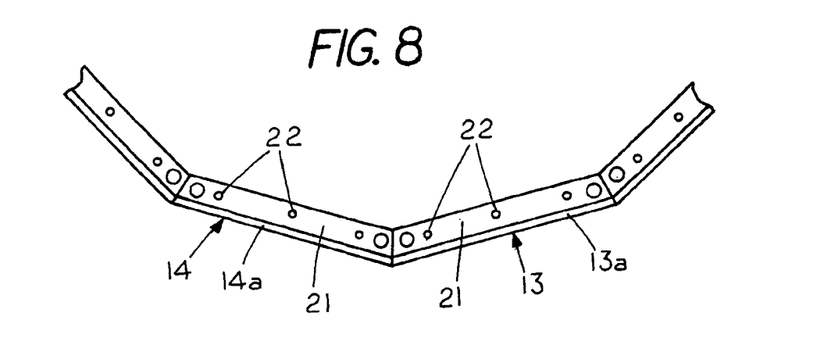
FIG. 8 shows a close-up view of the base plate supporting member of FIG. 7.

Referring to FIGS. 7 and 8, FIG. 7 is a bottom view of portable storm resistant dome-shaped shelter 10 showing segments 13 and 14 each having a base plate-supporting member 21. FIG. 8 shows a close-up view of base plate supporting member 21 and 22, which each extends from the first ends 13a and 14a of the segments 13 and 14 inwardly towards the center mast 12 when the segments 13 and 14 are in the assembled condition. Although all of the base plate supporting members 21 are shown including bolt holes 22 for receiving a bolt therethrough for securement of the associated segments to support base 11, in the embodiment of FIGS. 7 and 8, it is preferred the female segments 13 are secured to the support base 11 through the use of the bolt holes 22 while the bolt holes 22 of the male segments 14 remain used or preferably unused and left within the discretion of the user.

In the embodiment of FIG. 7 portable storm resistant dome-shaped shelter 10 is shown having air ventilation system 20 located on male segment 20 and a second air ventilation system comprising a plurality of screened vent holes located proximal the second end 12b of center mast 12.

It is noted that while the embodiment of FIG. 7 shows the portable storm resistant dome-shaped shelter 10 comprising of six (6) female segments 13 and six (6) male segments 14, alternative embodiment may comprise more than or less than six (6) female segments 13 and six (6) male segments 14.

Figure 9:
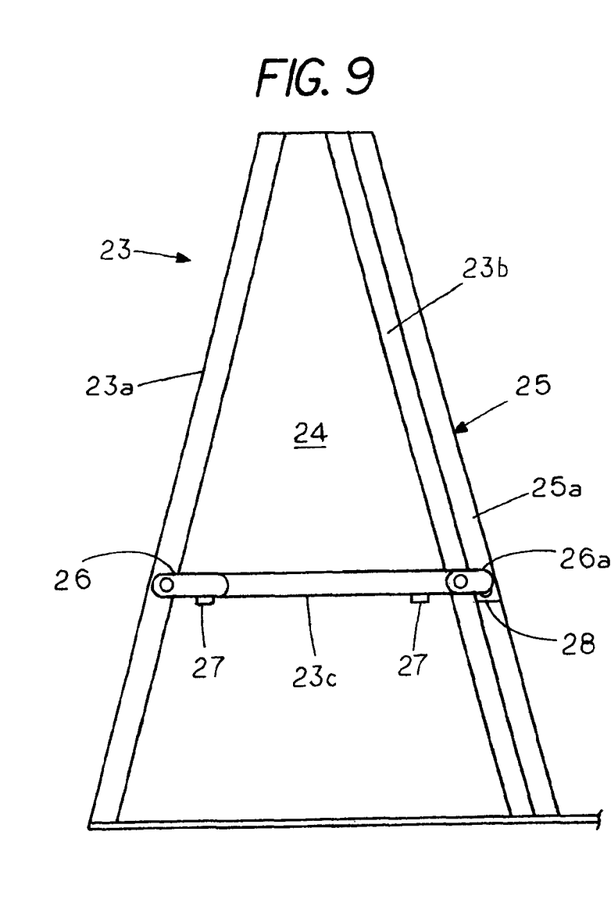
FIG. 9 show a back view of an embodiment of a female segment having a manually releasable latch assembly securing a female side member to an adjacent male segment side member.

FIG. 9 show a back view of an embodiment of a female segment 23 having a first arched side member 23a, a second arched side member 23b, and a cross member 23c connecting first arched side member 23a with a second arched side member 23b, and a weather and UV resistant covering skin 24. FIG. 9 also shows second arched side member 23b of female segment 23 engaging a side member 25a of an adjacent male segment 25.

Another feature of the present invention, as shown in the embodiment of FIG. 9, is that each arched side member of the female segments includes a manually releasable latch assembly 26, 26a securing the female side member to an adjacent arched side member of an adjacent male segment. FIG. 9 shows first arched side member 23a and second arched side member 23b of female segment 23 each having a latch assembly 26, 26a located proximal the ends of cross member 23c with the latch assembly 26 of first arched side member 23a shown in an unlocked or disengaged condition from a side member of a male segment and resting on a stop 27 located on cross member 23c.

The latch assembly 26a of second arched side member 23b is shown in a locked or engaged condition with side member 25a of adjacent male segment 25 and functions to secure side member 25a of adjacent male segment 25 to second arched side member 23b of female segment 23. Latch assembly 26a is supported and maintained in the locked conditioned by resting on a stop 28 located on the side member 25a of male segment 25.

Figure 9A:
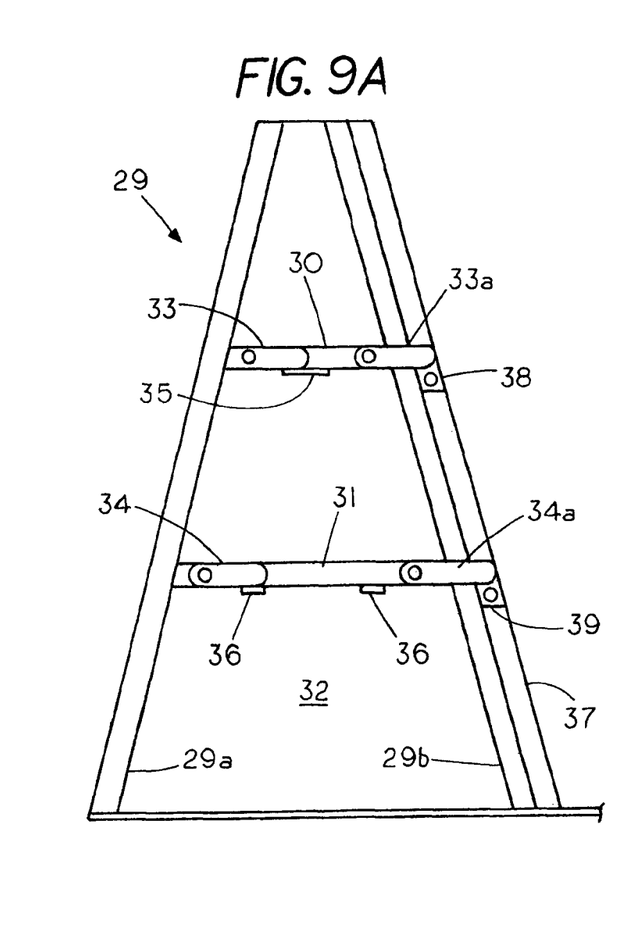
FIG. 9A is a back view showing an alternative embodiment of a female segment having a pair of latch assemblies located on each female segment side member.

FIG. 9A is a back view showing an alternative embodiment of a female segment 29 having similar components to similar to the female segment 23 of FIG. 9. However, instead of each arched side member 23a, 23b of the female segment 23 having a latch assembly the embodiment of FIG. 9A shows the use of a pair of latch assemblies for securing each arched side member of a female segment to the adjacent arched side member of a male adjacent segment.

More specifically, female segment 29 is shown having a first cross member 30 and a second cross member 31 connecting first arched side member 29a with a second arched side member 29b, and a weather and UV resistant covering skin 32. Unlike the embodiment of FIG. 9 the first cross member 30 and the second cross member 31 are shown having a latch assembly 33, 34 located on each of their ends proximal first arched side member 29a of female segment 29 and a latch assembly 33a, 34b located on each of their opposing ends proximal second arched side member 29b of female segment 29. Pair of latch assemblies 33 and 34 are shown in an unlocked or disengaged condition from a side member of a male segment and resting on latch stops 35 and 36 which are located on cross members 30 and 31. Pair of latch assemblies 33a and 34a are shown in a locked or engaged condition with a side member 37a of a male segment 37 and functions to secure side member 37a of adjacent male segment 37 to second arched side member 29b of female segment 29. Latch assemblies 33a and 34a are shown supported and maintained in the locked conditioned by resting on latch stops 38 and 39 both located on the side member 37a of male segment 37.

Figure 10:
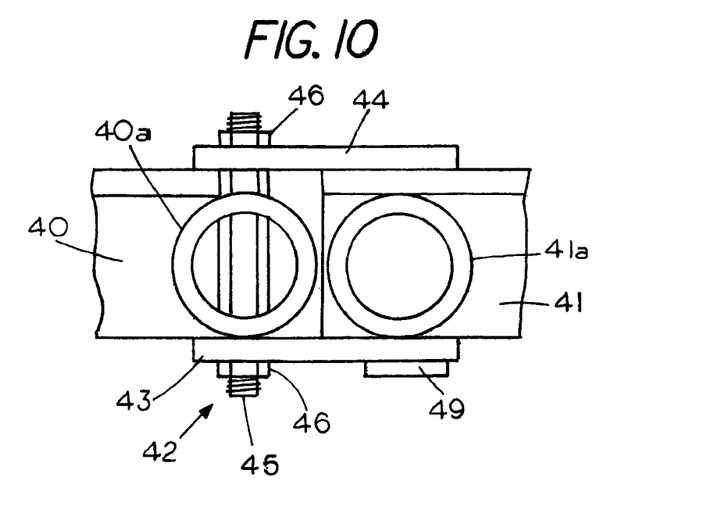
FIG. 10 shows a partial cross-sectional top view of the connection between a female segment and a male segment with a dual latch assembly in a locked or engaged condition.
Figure 11:
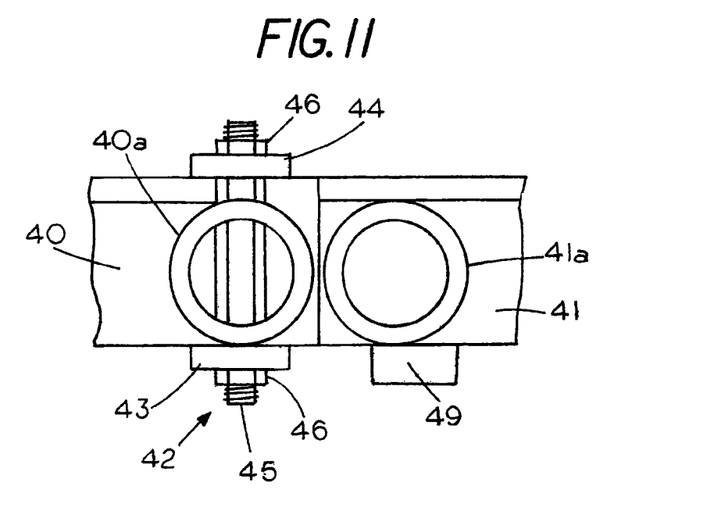
FIG. 11 shows a partial cross-sectional top view of the connection between a female segment and a male segment with the dual latch assembly in an unlocked or disengaged condition.

FIGS. 10 and 11 each show a partial cross-sectional top view of the connection between a female segment 40 and a male segment 41 with FIG. 10 showing a dual latch assembly 42 in a locked or engaged condition and FIG. 11 showing the dual latch assembly 42 in an unlocked or disengaged condition. The dual latch assembly 42 generally comprises an interior latch 43 and an exterior latch 44 connected by a threaded rod 45 extending through an arched side member 40a of female segment 40. In the embodiment of FIGS. 10 and 11 the interior latch 43 and exterior latch 44 are maintained on the threaded rod 45 a pair of bolts 46 and their assembly enables the interior latch 43 and exterior latch 44 to move in mirror unison. That is movement of the interior latch 43 from the locked or engaged condition to the unlocked or disengaged condition will also result in movement of the exterior latch 44 from the locked or engaged condition to the unlocked or disengaged condition and vice versa. As such the dual latch assembly 42 may be operated either inside the shelter, outside of the shelter, or both.

In the locked or engaged condition both the interior latch 43 and exterior latch 44 of the dual latch assembly 42 extend over a portion of male segment 41 to secure and maintain arched side member 41a of male segment 41 to arched side member 40a of female segment 40. As shown in FIG. 10 dual latch assembly 42 is supported and maintained in the locked or engaged conditioned through the resting of interior latch 43 on a stop 49 located on side member 41a of male segment 41.

In the unlocked or disengaged condition from the side member 41a of male segment 41 both the interior latch 43 and exterior latch 44 of the dual latch assembly 42 extend along the side member 40a of female segment 40a to provide the side member 41a of male segment 41 with unencumbered or unrestricted movement by either both latches 43 and 44.

It is noted that a feature of the present invention is that since the male segments of the present invention are not secured to the support base 11 by bolts all male segments may be individually removed and used as doorways for ingress and egress when both side members of the specific male segment are unlatched from their adjacent side members of the adjacent female segments and the center seal cap 19 is disengaged from the segments.

The present invention also includes a method for producing an outdoor storm resistant dome-shaped shelter 10 which is readily manually assembled and disassembled as needed, comprising the steps of: (1) forming a plurality of equally dimensioned stackable triangular shaped arched segments 13, 14 each having a pair of spaced apart rigid upwardly arched side members 13b and 14b converging upwardly from a lower end 13a, 14a of the segment 13, 14 with the segments 13, 14 each comprising a one piece molded chemical and corrosion resistant polymer plastic with a weather and UV resistant covering skin 24; (2) placing a multiplicity of said segments 13, 14 side to side with the lower end 13a, 14a of each of the segments 13, 14 resting on a support base 11 and the upwardly converging side members 13b, 14b reaching an upper end to enclose a generally circular area; (3) releasably latching the side member 13b of each segment 13 to the side member 14b of the adjacent segment 14; and (4) releasably locking together the upper ends of the segments.

I claim:

1. A storm resistant dome-shaped shelter, which is readily manually assembled and disassembled, as needed, said shelter comprising:
   a plurality of side-by-side generally triangular shaped arched segments enclosing a generally circular area;
   a support base;
   each of said segments comprising a lower end resting on said support base and a pair of spaced apart rigid upwardly arched side members converging upwardly from said lower end and a weather and UV resistant covering skin;
   a manually releasable latch assembly securing each arched side member of a segment to the adjacent arched side member of an adjacent segment;
   a rigid vertical support mast releasably secured at the center of the encircled area; and
   manually releasable locking means securing said mast to said segments.

2. The storm resistant dome-shaped shelter of claim 1 including an air ventilation system.

3. The storm resistant dome-shaped shelter of claim 1 wherein said plurality of side-by-side generally triangular shaped arched segments comprise a plurality of female segments each having a slotted tapered end and a plurality of male segments each having an abutment tapered end, said slotted tapered end receiving a portion of an end of a tubular rigid vertical support mast therein and said abutment tapered end engaging a portion of said end of said tubular rigid vertical support mast directly adjacent said slotted tapered end.

4. The storm resistant dome-shaped shelter of claim 1 wherein each of said triangular shaped arched segments comprises a corrosion and chemical resistant polymer plastic.

5. The storm resistant dome-shaped shelter of claim 1 wherein said pair of spaced apart rigid upwardly arched side members and said weather and UV resistant covering skin comprises a one-piece molding.

6. The storm resistant dome-shaped shelter of claim 5 wherein said latch assembly comprises an interior latch and an exterior latch connected by a threaded rod extending through each arched side member of said female segments.

7. The storm resistant dome-shaped shelter of claim 3 wherein said plurality of side-by-side generally triangular shaped arched segments comprises six female segments and six male segments.

8. The storm resistant dome-shaped shelter of claim 1 wherein said manually releasable latch assembly comprises a pair of manually releasable latch assembly securing each arched side member of a segment to the adjacent arched side member of an adjacent segment.

9. The storm resistant dome-shaped shelter of claim 2 wherein said air ventilation system is located on at least one of said triangular shaped arched segments.

10. The storm resistant dome-shaped shelter of claim 2 wherein said air ventilation system is located on both at least one of said triangular shaped arched segments and on said rigid vertical support mast.

11. The storm resistant dome-shaped shelter of claim 1 wherein said triangular shaped arched segments are equal dimensioned and are stackable to reduce required storage space.

12. The storm resistant dome-shaped shelter of claim 3 wherein each of said female segments includes weather resistant seals located along the edges of said female segments.

13. A storm resistant dome-shaped shelter, which is readily manually assembled and disassembled, as needed, said shelter comprising:
   a plurality of side-by-side generally triangular shaped arched segments enclosing a generally circular area, said plurality of side-by-side generally triangular shaped arched segments are stackable to reduce required storage space;
   a support base;
   a tubular rigid vertical support mast having a first end and a second end with said first end of said tubular rigid vertical support mast releasably secured to said support base at the center of said encircled area;
   each of said segments comprising a lower end resting on said support base and a pair of spaced apart rigid upwardly arched side members converging upwardly from said lower end and a weather and UV resistant covering skin;
   said plurality of side-by-side generally triangular shaped arched segments comprising a multitude of female segments each having a slotted tapered end located distal said lower end and a multitude of male segments each having an abutment tapered end located distal said lower end, said slotted tapered end of said female segment receiving a portion of said second end of a tubular rigid vertical support mast therein and said abutment tapered end of said male segment engaging a portion of said second end of said tubular rigid vertical support mast directly adjacent said slotted tapered end of said female segment;

a manually releasable latch assembly comprises an interior latch and an exterior latch connected by a threaded rod extending through each arched side member of said female segment, said latch assembly securing each arched side member of said female segment to the adjacent arched side member of said adjacent male segment; and manually releasable locking means securing said mast to said segments.

14. The storm resistant dome-shaped shelter of claim 13 including an air ventilation system located on both at least one of said triangular shaped arched segments and on said rigid vertical support mast.

15. The storm resistant dome-shaped shelter of claim 13 wherein each of said female segments includes weather resistant seals located along the edges of said female segments.

16. The storm resistant dome-shaped shelter of claim 15 wherein said female and male segments comprises a corrosion and chemical resistant polymer plastic.

17. The storm resistant dome-shaped shelter of claim 16 wherein each of said pair of spaced apart rigid upwardly arched side members and said weather and UV resistant covering skin comprises a one-piece molding.

18. The storm resistant dome-shaped shelter of claim 17 wherein each arched side member of said female segments includes a pair of latch assembly located thereon.

19. The storm resistant dome-shaped shelter of claim 18 wherein each of said female segments includes weather resistant seals located along the edges of said female segments.

20. A method for producing an outdoor storm resistant dome-shaped shelter which is readily manually assembled and disassembled as needed, comprising the steps of:

forming a plurality of equally dimensioned stackable triangular shaped arched segments each having a pair of spaced apart rigid upwardly arched side members converging upwardly from a lower end of the segment with the segments each comprising a one piece molded chemical and corrosion resistant polymer plastic with a weather and UV resistant covering skin;

placing a multiplicity of said segments side to side with the lower end of each of the segments resting on a support base and the upwardly converging side members reaching an upper end to enclose a generally circular area;

releasably latching the side member of each segment to the side member of the adjacent segment; and releasably locking together the upper ends of the segments.

* * * * *